Nov. 24, 1936.  C. W. DAVENPORT  2,061,791
COTTON STALK KNOCKER
Filed Jan. 2, 1936  2 Sheets-Sheet 1

Inventor
C. W. Davenport

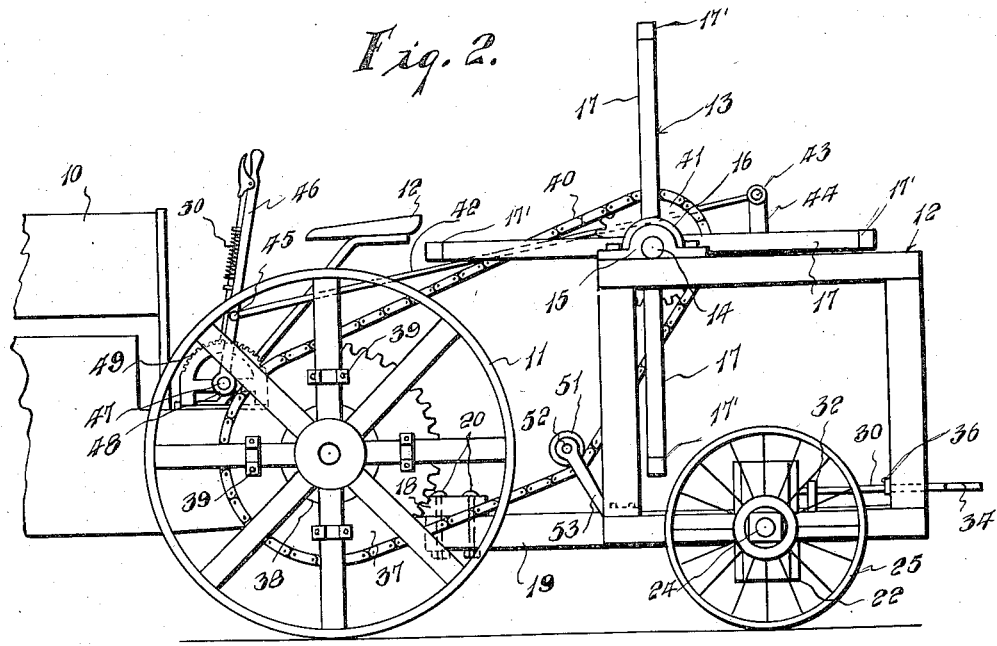
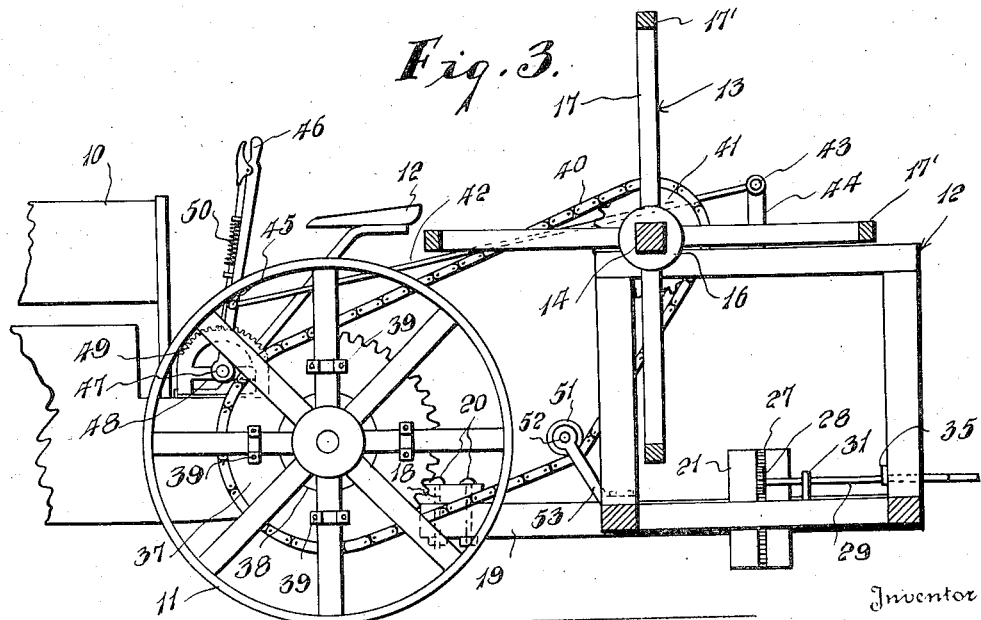

Patented Nov. 24, 1936

2,061,791

UNITED STATES PATENT OFFICE 2,061,791

COTTON STALK KNOCKER

Charles W. Davenport, Gunter, Tex.

Application January 2, 1936, Serial No. 57,276

5 Claims. (Cl. 56—60)

This invention relates to a cotton stalk knocker or breaker.

It is aimed to provide a machine of this character adapted to knock or break cotton or other stalks, particularly standing cotton stalks where grain has been sown after the cotton, and in a manner without touching the ground or damaging the grain.

It is further aimed to provide such a construction which is readily attachable to and detachable from a tractor, to be drawn and operated by the latter.

It is further aimed to provide a construction having a reel or beater and coacting bar to effect the breaking of the stalks, and means to mount the same at different heights and angles.

The more specific objects and advantages will become apparent from a consideration of the description following taken in connection with accompanying drawings illustrating an operative embodiment.

In said drawings:—

Figure 2 is a side elevation of the parts of Figure 1;

Figure 3 is a longitudinal sectional view taken on the plane of line 3—3 of Figure 1;

Figures 1, 4, 5:
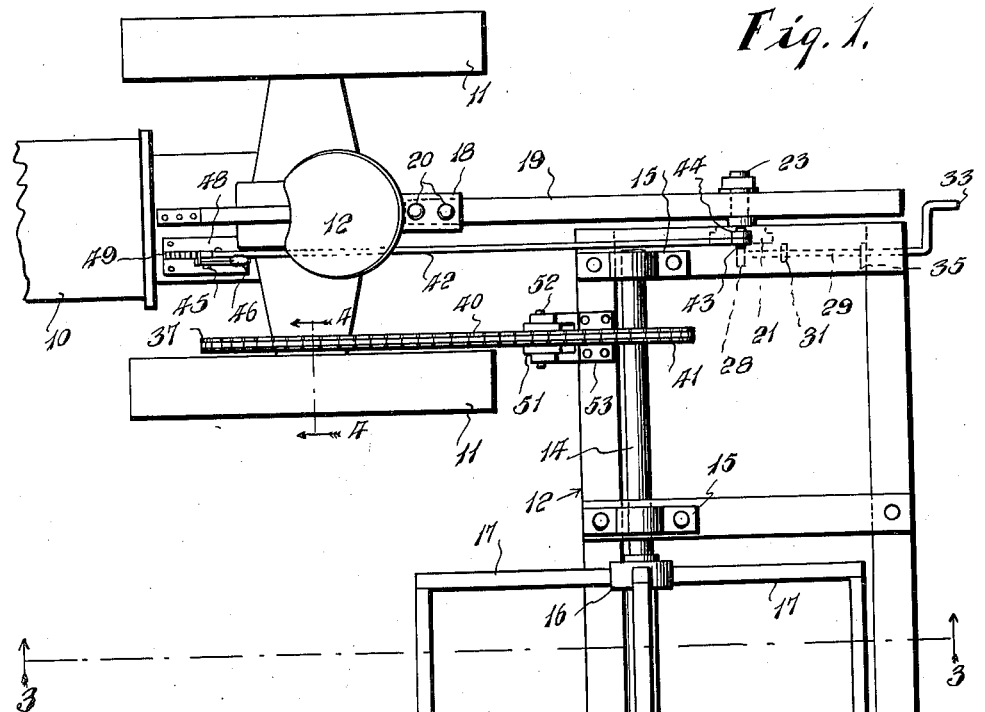
Figure 1 is a plan view of the invention attached to a tractor, the latter being shown fragmentarily.
Figure 4 is a vertical sectional view taken on the line 4—4 of Figure 1.
Figure 5 is a detail section taken on the line 5—5 of Figure 1.

Referring specifically to the drawings, wherein like reference characters designate like or similar parts, a conventional tractor is fragmentarily shown at 10, its rear wheels being designated 11, and the driver's seat being shown at 12.

In accordance with my invention, a substantially rectangular elongated skeleton frame is shown at 12, disposed above the ground, and mounting a knocker or breaker reel as at 13. Such reel has a shaft or axle 14 suitably journaled in bearings 15 mounted across the top of the elements of said frame 12. The reel further has hubs as at 16, to which the free ends of arms or beater members 17 are fastened. It will be noted that the frame 12 avoids obstruction adjacent the reel so that the latter may be readily rotated.

A suitable part of the tractor 10 has a central rearwardly extending lug or clevis 18, to which a rearwardly extending draw bar 19 is bolted as at 20.

At opposite ends of the frame 12, brackets 21 and 22 are vertically slidable. Bracket 21 carries an axle or stub shaft 23 journaled in the draw bar 19, while the bracket 22 has an axle or stub shaft 24 on which a ground wheel 25 is journaled.

Said brackets 21 and 22 are adapted for vertical adjustment to govern the height and inclination of the frame 12. To this end said brackets 21 and 22, as at 26 and 27, are provided with ratch teeth with which pinions 27 and 28, respectively, are enmeshed. Said pinions are carried by shafts 29 and 30, respectively, journaled in suitable bearings as at 31 and 32, respectively, and which shafts may be operated by the hand crank or the like as at 33 and 34, respectively. Said shafts 29 and 30 may be latched or locked against accidental turning by any suitable means as at 35 and 36, respectively.

Power for rotating the reel is derived from one of the ground wheels 11 of the tractor. To this end, a sprocket wheel 37, centrally cut away at 38, to fit over the axle and housing of the tractor, is detachably connected to spokes of the wheel 11 by means of U-bolts or the like, as at 39. Such sprocket wheel 37 is traversed by a sprocket chain 40, which is also trained over a sprocket wheel 41 keyed to the shaft 14.

In order to tilt the reel frame 12 from the driver's seat, a pitman 42 is pivoted at 43 to a stud 44 on the frame 12. The other end of said pitman 42 is pivoted as at 45 to an adjusting lever 46, pivoted as at 47, to a bracket 48 suitably fastened to the frame of the tractor, and which bracket has a notched or locking segment at 49, detachably engageable by latch means 50 on the lever 46.

A suitable guide means for a sprocket chain 40 is provided on the frame 12 and may comprise a roller 51 pivoted at 52 to a bracket 53 mounted on said frame 12.

In the use of the machine, as the tractor is drawn over the field, the reel is rotated by the sprockets 37 and 41 and chain 40, traveling in the direction of the arrow in Figure 2, that is, contra-clockwise. The horizontal portions 17' of the beaters are disposed in parallelism with a front bar 12' of the frame 12, and such portions 17' move relatively close to the bar 12', and accordingly the stalks in the path of the reel will be knocked or struck thereby and moved into engagement with bar 12', resulting in the breaking or severance thereof and distribution evenly over the field. It will be realized that such action takes place above the ground and will not destroy the grain or the like.

Various changes may be resorted to provided they fall within the spirit and scope of the invention.

I claim as my invention:—

1. An attachment for a draft vehicle having a rotatable element, a frame having a bar, a beater means journaled on said frame disposed laterally beyond one side of the draft vehicle, and arranged to move stalks against said bar for breakage, and means operable to drive said beater means attachable to said wheel.

2. An attachment for a draft vehicle, having a rotatable element, a frame having a bar, a beater means journaled on said frame and arranged to move stalks against said bar for breakage, means operable to drive said beater means attachable to said element and disposing the beater means and adjacent portion of the frame laterally beyond one side of the draft vehicle, a ground wheel, a bracket carrying said ground wheel, and means operable to vary the position of the bracket relatively to the frame.

3. An attachment for a draft vehicle having a rotatable element, a frame having a bar, a beater means journaled on said frame and arranged to move stalks against said bar for breakage, means operable to drive said beater means attachable to said element, a draw bar on said frame attachable to the draft vehicle and disposing the beater means and adjacent portion of the frame laterally beyond one side of the draft vehicle.

4. An attachment for a draft vehicle having a rotatable element, a frame having a bar, a beater means journaled on said frame and arranged to move stalks against said bar for breakage, means operable to drive said beater means attachable to said element, a draw bar on one side of said frame attachable to the draft vehicle and disposing the beater means and adjacent portions of the frame laterally beyond one side of the draft vehicle, guide means on the frame for said operating means, and lever and pitman means connected to the frame operable to angularly dispose the frame.

5. An attachment for a draft vehicle having a rotatable element, a frame having a bar, a beater means journaled on said frame, and arranged to move stalks against said bar for breakage, means operable to drive said beater means attachable to said element, a draw bar on said frame attachable to the draft vehicle, axle members, brackets carrying said axle members, means operable to vary the position of the brackets relatively to the frame, one of said axle members being connected to the draw bar, and a wheel connected to the other axle member.

CHARLES W. DAVENPORT.